United States Patent Office 3,536,636
Patented Oct. 27, 1970

---

3,536,636
POLYFLUOROPHENYLENE POLYMERS
Christ Tamborski, Dayton, Ohio, assignor to the United States of America as represented by the Secretary of the Air Force
No Drawing. Filed May 8, 1968, Ser. No. 727,687
Int. Cl. C08g 33/00
U.S. Cl. 260—2                                      3 Claims

ABSTRACT OF THE DISCLOSURE

This invention comprises a process for preparing polyfluorophenylene polymer and the product produced thereby. Contrary to related products produced in the prior art, the polymer product of this invention is free from bromine. The process for making the new bromine-free polymer consists in polymerizing pentafluorophenyllithium or nonafluorolithium diphenyl. The pentafluorophenyllithium is prepared by reacting an alkyllithium, such as butyllithium, with pentafluorobenzene while the temperature is maintained at approximately −70° C. or lower. Polymerization occurs rapidly upon warming to room temperature. The diphenyl compound polymerizes at even lower temperatures. In both cases, the resultant polymer has excellent thermal stability.

---

The invention described herein may be manufactured and used by or for the United States Government for governmental purposes without payment to me of any royalty thereon.

BACKGROUND OF THE INVENTION

Field of the invention

The present invention relates to the preparation of a polymer stable to high temperatures. More specifically it relates to a polymer having the repeating unit —$C_6F_4$—. Still more specifically it relates to a method of preparing such polymers which gives polymer products free of bromine. Still more specifically it relates to a method of preparing such polymers merely by warming pentafluorolithium from extremely low temperatures such as −70° C. up to room temperature, or by allowing nonafluorolithium-diphenyl to stand at even lower temperatures.

Description of the prior art

In a paper given at the XIXth International Congress of Pure and Applied Chemistry in London in July, 1963, E. J. P. Fear et al. disclosed a method of making polymers somewhat similar to those of the present invention except that these prior art polymers have a relatively high percentage of bromine. (See Technical Note No. CPM 26, Royal Aircraft Establishment, August 1963, on Perfluorophenylenes from Pentafluorophenyl Magnesium Bromide.) These prior art polymers are prepared by heating pentafluorophenyl-magnesium-bromine to room temperature. The authors of this prior art work admit the presence of large amounts of bromine in their polymer products and disclose the mechanism which they believed to be responsible for the bromine entering into the polymerization process with resultant incorporation into the polymer. The presence of bromine in such polymers has a disadvantageous effect on the thermal stability of the material.

SUMMARY OF THE INVENTION

The disadvantages of the prior art polymers of this type are avoided by the process of this invention and the bromine-free products produced thereby.

In accordance with the practice of this invention tetrafluorophenylene polymers are prepared by the polymerization of pentafluorophenyllithium or nonafluorobiphenyllithium. The latter is more sensitive to polymerization and polymerizes rapidly even when standing at −70° C. The pentafluorophenyllithium polymerizes merely upon allowing the temperature to rise from −70° C. up to room temperature.

The pentafluorophenyllithium compound is advantageously prepared by the reaction of an alkyllithium advantageously of no more than eight carbon atoms, such as butyllithium, with pentafluorobenzene at very low temperatures, such as −70° C. or lower, as shown by the following:

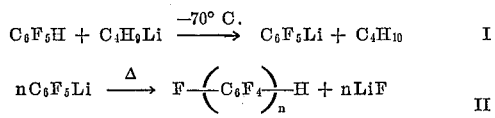

$$nC_6F_5Li \xrightarrow{\Delta} F{-}\!\!\left(\!C_6F_4\!\right)_{\!n}\!\!{-}H + nLiF \quad\quad\quad II$$

In place of $C_4H_9Li$, the corresponding amyl, propyl, hexyl, nonyllithium can be used.

The nonafluorobiphenyllithium is similarly prepared by the reaction of the corresponding nonafluorobiphenyl with lithiumalkyls as follows:

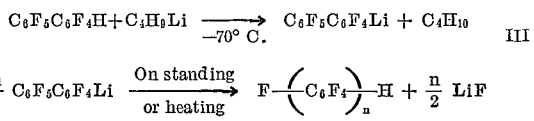

$$\tfrac{n}{2}\,C_6F_5C_6F_4Li \xrightarrow[\text{or heating}]{\text{On standing}} F{-}\!\!\left(\!C_6F_4\!\right)_{\!n}\!\!{-}H + \tfrac{n}{2}\,LiF$$

In these polymers $n$ has a value of at least 4 and may be as high as 100.

These polymers have excellent thermostability as shown by the initial gross decomposition at over 600° C. They are insoluble in organic solvents such as benzene, toluene, ethyl acetate, butyl acetate, methanol, ether, etc. They are only very slightly soluble in tetrahydrofuran. The elemental analyses and infrared data confirm the structure indicated above. The polymers are believed to be predominantly para oriented.

The polymers of this invention have excellent thermostability and are particularly useful as a filler for fluorine-containing elastomers, such as fluoroalkyltriazine polymers to give more body without sacrificing any of the thermostability of the elastomer.

DESCRIPTION OF THE PREFERRED EMBODIMENTS

The invention is best illustrated by the following examples. These examples are presented solely for illustrative purposes and it is not intended that the scope of the invention or the manner in which it may be practiced are restricted by these specific examples. Except where specifically indicated otherwise, parts and percentages are given by weight. Temperatures are in ° C.

EXAMPLE I

Preparation of polyfluorophenylene polymer from pentafluorobenzene

To a nitrogen-purged, 1 liter, 4-necked round bottom flask equipped with a stirrer, addition funnel, thermometer and nitrogen inlet is added 300 ml. of freshly distilled tetrahydrofuran and 75.6 g. (0.45 mole) of pentafluorobenzene. The pentafluorobenzene solution is cooled to −70° C. in an alcohol-Dry Ice bath. A solution of n-butyllithium (242.5 ml., 0.45 mole) in hexane is added dropwise with stirring. After stirring an additional 45 minutes, the reaction mixture gives a negative test for the presence of n-butyllithium. The reaction mixture is then allowed to warm up by removing the cooling bath. At about +5° the reaction becomes very exothermic with the temperature rising to 50°. The reaction is cooled externally with a water bath. A qualitative test for the presence of an aryllithium is negative. The product is then hydrolyzed with 6 N hydrochloric acid. The white precipitate from this reaction is filtered and repeatedly washed with 6 N hydrochloric acid and finally with large volumes of water. The resulting material is finally dried in a vacuum oven to constant weight. This material does not melt up to 500° as indicated by a differential thermal calorimeter. The infrared spectrum of this material displays strong absorption between 1500 cm.$^{-1}$ and 970 cm.$^{-1}$ indicative of C—F bands and has a strong band at 710 cm.$^{-1}$. Elemental analysis of this material shows 0.05% lithium. An XRD pattern shows the material to be amorphous and to contain no detectable lithium fluoride. The material is insoluble in all common organic solvents.

Similar polymers are obtained when the above procedure is repeated using the corresponding amyl, propyl, hexyl and octyllithium compounds in place of the butyllithium.

EXAMPLE II

Preparation of polyfluorophenylene polymer from 4-hydro-nonafluorobiphenyl

To a nitrogen-purged, 500 ml., 4-necked flask equipped with a stirrer, addition funnel, thermometer and nitrogen inlet is added 250 ml. of freshly distilled tetrahydrofuran and 10.0 g. (0.031 mole) of 4-hydro-nonafluorobiphenyl. The solution is cooled to −70° in an alcohol-Dry Ice bath. A solution of n-butyllithium (20.5 ml., 0.031 mole) in hexane is added dropwise with stirring over a period of 15 minutes. After an additional 20 minutes of stirring at −70°, a qualitative test for the presence of an organolithium is negative. The reation mixture is then hydrolyzed with 6 N hydrochloric acid. The resultant white precipitate is filtered and repeatedly washed with 6 N hydrochloric acid and finally with large volumes of water. The product is finally dried in a vacuum oven to constant weight. The resulting material has the same properties as the material synthesized from pentafluorobenzene as described in Example I. The infrared curves of both materials are identical. Due to the insolubility of this polymer, no precise molecular weights could be determined. However from the melting point and infrared analysis, the value of $n$ (see Equations II and IV) is estimated at a minimum of 4 and a maximum of 100.

While certain features of this invention have been described in detail with respect to various embodiments thereof, it will, of course, be apparent that other modifications can be made within the spirit and scope of this invention and it is not intended to limit the invention to the exact details shown.

The invention claimed is:

1. A process of preparing a bromine-free polymeric tetrafluorophenylene having the formula $F\text{-}(C_6F_4)_n\text{H}$ wherein $n$ has a value of at least 4 which comprises the steps of mixing and reacting an alkyllithium with nonafluorobiphenyl, thereby obtaining nonafluorobiphenyl lithium; interreacting a number of molecules of said nonafluorobiphenyllithium and separating lithium fluoride therefrom.

2. The process of claim 1 in which said steps are conducted in the presence of tetrahydrofuran as a reaction medium.

3. The process of claim 1 in which said nonafluorobiphenyllithium is maintained at a temperature of at least −70° C.

References Cited

UNITED STATES PATENTS 3,159,589  12/1964  Bloomfield et al. _____ 260—2

FOREIGN PATENTS 1,016,024  9/1957  Germany.
1,004,636  9/1965  Great Britain.
1,052,482  12/1966  Great Britain.

OTHER REFERENCES

Hellmann et al., "Jour. American Chem. Soc.," vol. 77 (July 1955), pp. 3650–3651.

Fenton et al. I, "Tetrahedron," vol. 21 (1965), pp. 3009–3018.

Fenton et al II, "Jour. of Organometallic Chemistry," vol. 2 (1964) pp. 437–446.

SAMUEL H. BLECH, Primary Examiner

U.S. Cl. X.R.

260—30.4, 649, 650, 823